Sept. 5, 1933.    R. STRESAU    1,925,118
PRESSURE VESSEL AND METHOD OF FABRICATING IT
Filed May 5, 1931    2 Sheets-Sheet 1
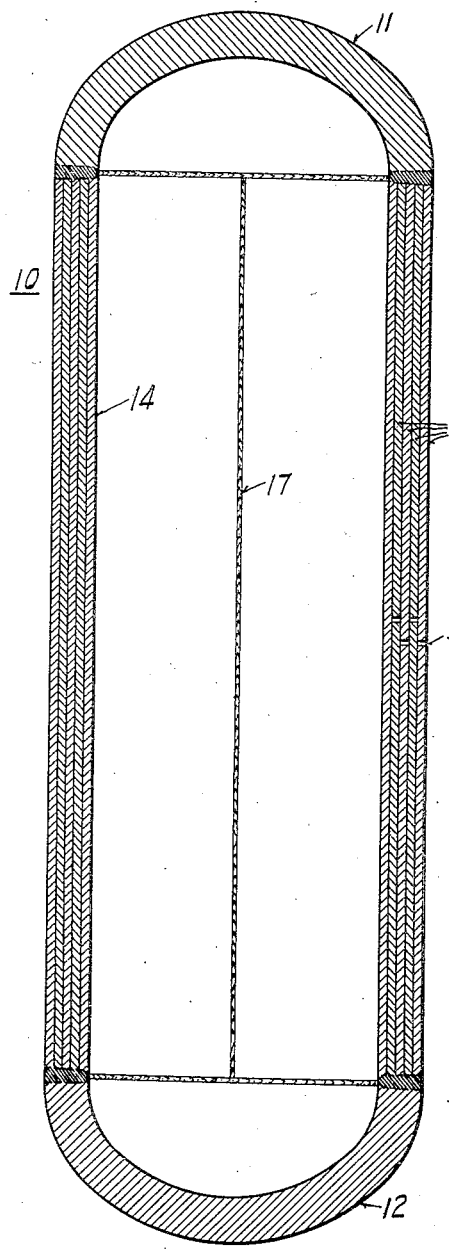
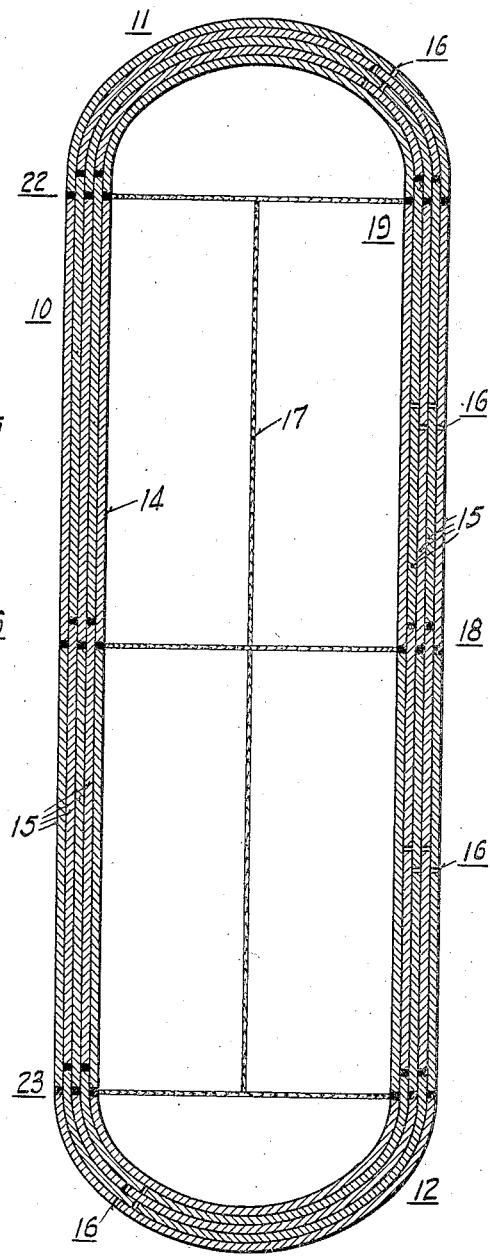
INVENTOR.
Richard Stresau
BY
ATTORNEY.

Sept. 5, 1933.　　　　　R. STRESAU　　　　　1,925,118
PRESSURE VESSEL AND METHOD OF FABRICATING IT
Filed May 5, 1931　　　2 Sheets-Sheet 2
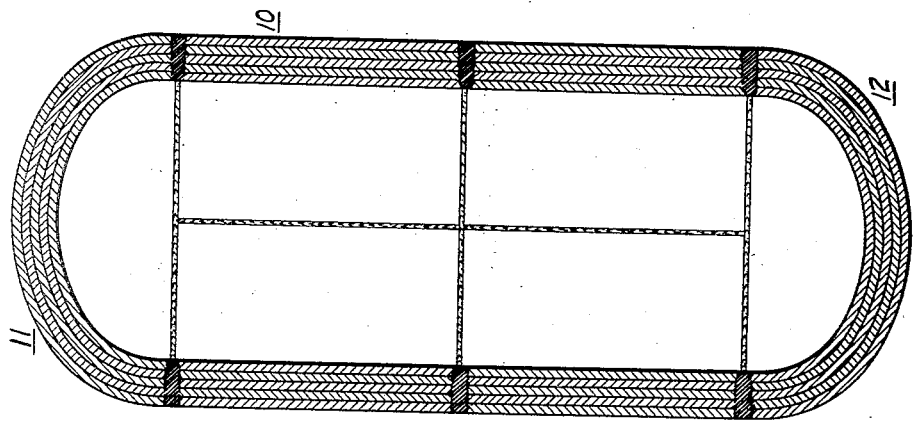
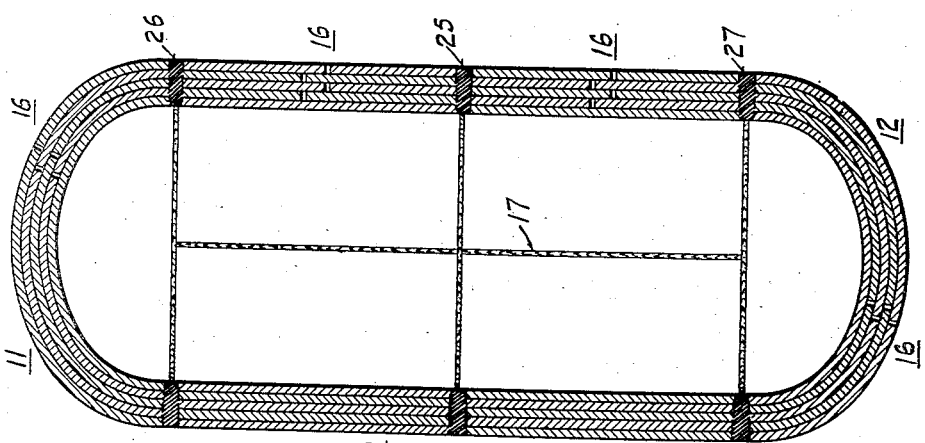
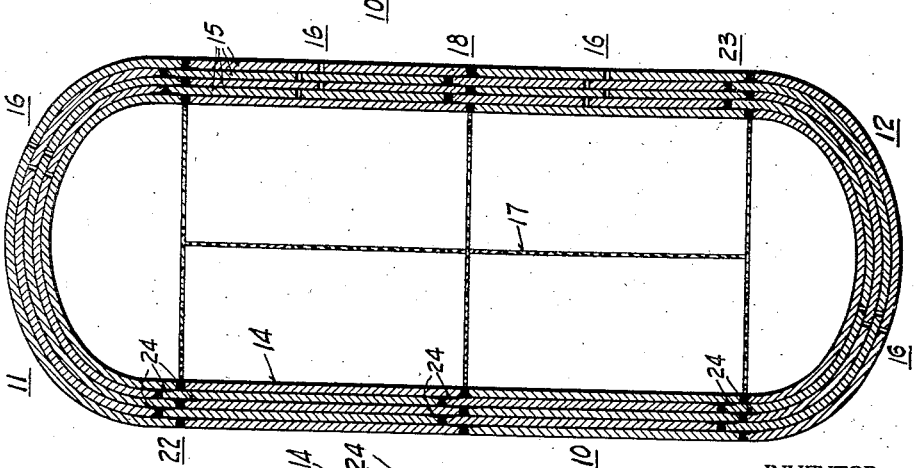
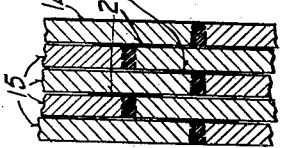
INVENTOR.
Richard Stresau
BY
ATTORNEY.

Patented Sept. 5, 1933

1,925,118

UNITED STATES PATENT OFFICE 1,925,118

PRESSURE VESSEL AND METHOD OF FABRICATING IT

REISSUED

Richard Stresau, Wauwatosa, Wis., assignor to A. O. Smith Corporation, Milwaukee, Wis., a corporation of New York Application May 5, 1931. Serial No. 535,159

18 Claims. (Cl. 29—148.2)

This application is a continuation in part of application Serial No. 183,175, filed April 12, 1927, covering Improvements in oil stills and pressure vessels and methods of manufacturing the same by electric arc welding, which is a continuation of application Serial No. 8,070, filed February 9, 1925, for Gas containers and methods of manufacturing the same by electric arc welding.

The invention relates generally to vessels and more particularly to vessels for withstanding high pressures and the method of fabricating them.

The object of the invention generally stated is the provision of a high pressure vessel that is strong and efficient in operation and that may be readily and economically manufactured.

A more specific object of the invention is to provide for building a laminated pressure vessel, the laminations of which may move relative to one another to distribute stresses when the vessel is subjected to internal pressures.

It is also an object of the invention to provide for building laminated pressure vessels to facilitate the working of the metal from which the vessels are fabricated.

Another object of the invention is to provide for fabricating pressure vessels of any desired thickness and strength.

For a fuller understanding of the nature and objects of the invention, reference may be had to the following detailed description taken in conjunction with the accompanying drawings, in which:

Figure 1 is a view in vertical section showing a laminated vessel constructed in accordance with the invention;

Fig. 2 is a view in vertical section of a modified type of pressure vessel which is laminated throughout;

Fig. 3 is a modification showing a pressure vessel comprising a plurality of independent containers, also constructed in accordance with my invention;

Fig. 4 is an enlarged sectional view showing heat insulating material between a portion of the laminations to prevent the welding of the latter together;

Fig. 5 is a view in vertical section of a pressure vessel which is fabricated by making the end and body sections as laminated units and then welding them together; and Fig. 6 is a vertical sectional view showing a modification of the pressure vessel illustrated in Fig. 5.

Referring to the drawings, the pressure vessel illustrated in Fig. 1 comprises a laminated body section 10 and solid end sections 11 and 12 made from thick plates. In connecting the body and end sections, any suitable method of fusing their edges together may be adopted. The method preferred is fusion by means of an electric arc.

In performing the arc welding operations, good results are obtained by using a metallic electrode to deposit a quantity of weld metal which is fused with the metal of the vessel sections. It is important in making the welds that the edges of the vessel sections be completely fused.

The laminated body section 10 illustrated may comprise any desired number of layers depending on the strength of the vessel required to meet operating conditions. In this particular instance, five laminations are shown in close contact with one another. The inner lamination or layer 14 is utilized as a fluid container while the outer layers 15 are provided to reenforce the container 14 and give the desired strength to the vessel.

In order to protect the outer laminations from excessive pressures when a leak develops, vents 16 are provided in the outer layers. If such vents are not provided and a leak is sprung in the lamination 14, then the outer layers of the vessel are subjected to the pressure which normally required all the laminations, and disruption of the outer layers may result. In the present structure, when a leak in the lamination or container 14 occurs, the fluid will find its way through vents 16 and thus prevent the building up of an excessive pressure on the outer layers.

In fabricating the body section 10, the inner lamination 14 is rolled from a flat plate into a tubular shape and the longitudinal meeting edges of the blank welded, giving a longitudinal seam 17. In applying the outer layers 15, different methods may be adopted; for example, the laminations 15 may be shaped to conform generally to the outer surface of the lamination or container 14, then pressed into position and the meeting edges welded, giving a longitudinal seam which not only units the meeting edges of the member 15 but also welds the lamination 15 to the lamination or container 14. In this manner any desired number of laminations may be superimposed upon the lamination 14. It is to be noted that the laminations are free to move relative to one another except at the seams.

In fabricating the structure in this manner, it is desirable that the longitudinal seams be spaced angularly. The spacing may be arrived at by dividing a circle by the number of layers. This staggering of seams will permit greater relative movement of the laminations when subjected to internal pressures than when the longitudinal seams coincide.

The body section 10 may also be fabricated by making a number of tubular laminations of the proper diameter and pressing one over the other. The first lamination 15 will be made with an internal diameter equal to the external diameter of the lamination or container 14. This method will give a body section 10 the laminations of which are independent of one another.

When a cylindrical vessel of the type illustrated in Fig. 1 is subjected to a high internal pressure, the body section 10 will tend to take the shape of a sphere. In a laminated structure the above tendency to change shape does not set up the high internal stresses in the metal that result in solid walled vessels of the same thickness as the laminated vessel, because the laminations may move relative to one another.

Vessels, when manufactured, are usually slightly out of shape and when such vessels are subjected to internal pressures, which tend to cause them to take the proper shape, the internal stresses set up in laminated vessels are much less than in the case of solid walled vessels of the same thickness because the laminations may move relative to one another.

In preparing plates for pressure vessels, it has been found difficult to work thick plates similar to those from which the end members 11 and 12 are made. On the other hand, the rolling and working required to produce thin plates such as those utilized for the laminations 14 and 15 improves the quality of the metal.

In the modification shown in Fig. 2, the end sections 11 and 12 as well as the body section 10 are made from thin sheets of metal thereby providing a vessel laminated throughout as distinguished from the vessel illustrated in Fig. 1, which has ends or heads made from thick plates. In this particular embodiment of the invention, the body section 10 is made in two parts which are connected together by the circumferential welds shown generally at 18. The practice of manufacturing the body section 10 in parts is resorted to when the vessels required are so long as to make it difficult and expensive to handle the laminations.

In fabricating a vessel such as shown in Fig. 2, the inner laminations of the ends 11 and 12 are welded to the inner lamination of the body section 10, thus forming a fluid container which, for the purpose of identification, will be designated by the numeral 19. The first lamination 15 is then mounted on the container 19 and the corresponding laminations of the end sections 11 and 12 welded to its ends. In such manner the desired number of laminations are assembled to make a vessel of the required strength.

The same methods of mounting the laminations 15 adopted for building up the body section 10 described for Fig. 1 may be resorted to. The tubular laminations of the body section 10 and the ellipsoidal laminations of the end sections 11 and 12 are off-set and when assembled the circumferential seams are in staggered relation.

The tubular laminations 15 and container 14 are welded together, along the seams 17 which unite the meeting edges of the tubular lamination, the circumferential seams 18 uniting the parts of the body section and the circumferential seams 22 and 23 which unite the laminations of the end sections 11 and 12 to corresponding laminations of the body section 10, respectively. Therefore the fabricated vessel illustrated in Fig. 2 comprises a series of laminated containers or envelopes which are substantially independent, being connected only along the staggered welded seams provided for making and connecting the laminations disposed outside of the fluid container 14.

When vessels are fabricated from a plurality of continuous or substantially continuous laminations, the latter may be made of different metals or alloys which may be selected because of their characteristics to meet operating conditions. In case the pressure vessel is to be utilized in the oil industry to hold liquids which rapidly corrode steel, then the inner lamination or container 14 may be made from some alloy which will resist corrosion.

The laminated vessel shown in Fig. 2 is provided with vents 16 for preventing the subjecting of the outer laminations to excessive pressures when leaks occur in the container 19. In view of the circumferential welds which unite the laminations 15 to one another and the inner lamination to the container 14, vents 16 are provided between the circumferential welds 18 and 22, and 18 and 23 and also in the laminations of the end sections.

The fabrication of the vessel, illustrated in Fig. 3, is identical with that illustrated in Fig. 2 with the exception that in mounting the inner lamination 15 on the container 14 and the laminations on one another, means is provided for preventing the weld metal from penetrating the container or the lamination next to the one being welded. Therefore when the structure is completed, the container 14 and laminations 15 are completely independent of one another and relative movement may take place during any change of shape of the vessel resulting from the application of internal pressures.

Referring to Fig. 4, the enlarged sectional view of the circumferential welds shows a heat resistant material 24 painted or otherwise applied to the outer walls of the container 14 and laminations 15 in line with the circumferential welds provided for uniting the laminations of the body section to the laminations of the end 11. This heat resistant coating prevents the weld metal from fusing to the outer walls of the container 14 or the laminations 15 and the result is that after the vessel has been fabricated, the laminations are completely independent throughout. Some compound of carbon such as graphite or a mixture of kaolin and lamp black has the desired characteristics to prevent the penetration of the arc and is not so bulky as to make its use difficult. In some instances, a thin layer of metal or a strip such as shown in my Patent No. 1,643,227 may be utilized.

In fabricating the vessel shown in Fig. 5, the body section 10 comprises a plurality of tubular laminations, the ends of which lie in the same plane. In the particular embodiment illustrated, the body section comprises two parts welded together by a single weld 25. As will be observed, the body section when standing alone is a laminated cylinder. The laminated end sections 11 and 12 are constructed to present a face simulating a section of a hollow cylinder which conforms in size and shape to the body section 10. Therefore when the end sections 11 and 12 are mounted on the body section 10, corresponding laminations are substantially in alignment.

In order to weld the end sections 11 and 12 to the body section 10, the abutting faces are chamfered to provide circumferential U-shaped grooves between them. When the end sections 11 and 12 are united with the body section 10 by welds 26 and 27, the vessel comprises a plurality of substantially continuous containers or laminations. Therefore in a fabricated structure, such as shown in Fig. 5, the laminations are substantially independent and may move relative to one another except at the circumferential welds 25, 26, and 27.

In some cases it may be desirable to fabricate the vessel with a different number of laminations in the head section from that provided in the body section. However, the two sections will preferably be made of substantially the same thickness.

Vents 16 are provided in the laminations of the vessel for purposes described hereinbefore. As shown, these vents are provided between the circumferential welds and in the ends.

The vessel shown in Fig. 6 is similar in construction to the vessel shown in Fig. 5 with the exception that no vents are provided in the laminations. For many purposes a vessel without vents is suitable. The construction of the body section 10 and end sections 11 and 12 and the fusing of them together to make a complete vessel may be executed in the same manner as described for the fabrication of the vessel shown in Fig. 5.

In constructing the laminated end sections 11 and 12, illustrated in Figs. 5 and 6, the laminations may be pressed into shape independently and then assembled. However, it has been found that good results and economy in manufacture may be obtained by pressing them all at the one time or by pressing a number of them at the same time and then fitting the groups of laminations to make the complete units.

The shape of the end members may be hemispherical or, as illustrated in the drawings, may be ellipsoidal. The shape resorted to will depend on the operating conditions to be met.

The figures of the drawings are intended to be diagrammatic, showing only the features of the invention. Therefore the openings or manways provided in all pressure vessels are omitted. However, it is to be understood that all the necessary inlet and outlet openings may be provided in accordance with standard practice.

Since numerous changes may be made in the above described structures and different embodiments of the invention may be made without departing from the spirit and scope thereof, it is intended that all matter contained in the above description or shown in the accompanying drawings shall be interpreted as illustrative and not in a limiting sense.

I claim:

1. A pressure vessel, the side walls of which comprise a plurality of concentric tubular members forming a laminated structure, the individual members of which are constituted by a sheet metal blank shaped into tubular form and fused at its meeting edges with the adjacent tubular member.

2. A pressure vessel, the side walls of which comprise a plurality of concentric tubular members forming a laminated structure, each of said tubular members comprising a plurality of aligned ring members fused to each other and to the adjacent concentric tubular members at the adjoining edges of said ring members.

3. A pressure vessel having a body portion comprising a plurality of concentric tubular members forming a laminated structure, each of said tubular members comprising a plurality of aligned ring members arranged end to end and fused to each other and to the adjacent concentric tubular member, the rings of each of said tubular members being in staggered relation to the adjacent rings of the concentric tubular members.

4. A pressure vessel comprising a body portion having a plurality of concentric tubular members forming a laminated structure, each of said tubular members comprising a plurality of aligned ring members arranged end to end and fused to each other and to the adjacent tubular member, the rings of each of said tubular members being in staggered relation to the rings of adjacent tubular members, and end portions fused to said body portion to provide a unitary structure.

5. A pressure vessel, the walls of which comprise a plurality of concentric layers of metal forming a laminated structure, each of said layers of metal comprising a body portion and end portions fused to said body portion, the lines of fusion in the individual layers being in staggered relationship to each other.

6. A pressure vessel having the walls thereof constituted of a plurality of concentric layers of metal forming a laminated structure and vented openings in the outer layers of said walls.

7. A method of making laminated pressure vessels which comprises forming a plurality of tubular members of different diameters from flat sheet metal blanks, fusing the longitudinal meeting lines of the tubular member having the smallest diameter, placing the tubular member having the next smallest diameter concentric with said smallest tubular member with the longitudinal meeting lines thereof in staggered relationship with the meeting lines of said first named tubular member, fusing the longitudinal meeting edges of said second named tubular member together and with said first named member, and continuing such operations until a wall of desired thickness has been built up, and fusing end portions on to the tubular members to form a unitary closed structure.

8. A method of making laminated pressure vessels which comprises shaping a flat sheet metal blank into a tubular form and fusing the longitudinal meeting lines thereof, fusing end members having the same thickness of said sheet metal blank to the ends of said tubular member, forming a second tubular member from a sheet metal blank and arranging it concentric with said first named tubular member, but in staggered relation thereto, and fusing end members on said second mentioned tubular members and continuing such operations to complete a laminated closed vessel of desired thickness.

9. A pressure vessel, the side walls of which comprise a plurality of concentric tubular members forming a laminated structure, the individual members of which are constituted by a sheet metal blank shaped into tubular form and fused at its meeting edges with the adjacent tubular member, thus providing a longitudinal seam in each tubular member, said longitudinal seams being staggered circumferentially, and end portions fused to the laminated structure to provide a unitary structure.

10. A pressure vessel comprising, in combination, a laminated body member and laminated end members, said body and end members being fused together with the laminations in alignment to provide a plurality of substantially continuous containers which may move relative to one another.

11. A pressure vessel comprising, in combination, a fabricated fluid container, a plurality of superimposed containers fabricated about the fluid container and in close contact therewith forming a laminated structure in which the laminations are disposed for relative movement.

12. A pressure vessel comprising a fluid container and a plurality of substantially independent containers enclosing the fluid container to provide a laminated structure.

13. A pressure vessel comprising a fluid container and a plurality of substantially independent containers fitted tightly over the fluid container to provide a laminated structure in which there may be relative movement between the containers.

14. A pressure vessel comprising, in combination, a fluid container and a plurality of containers enclosing the fluid container, said containers being disposed for relative movement to provide a multiple structure having a capacity for withstanding internal pressure substantially equal to the sum of the capacities of the individual containers.

15. A pressure vessel comprising a fluid container and a plurality of substantially independent containers enclosing the fluid container to provide a laminated structure, said independent containers being provided with vents to prevent the subjecting of the outer layers to excessive pressures when a leak occurs in the fluid container.

16. A pressure vessel comprising, in combination, a laminated tubular body section, curved laminated end sections, the laminations of the body and end sections being independent and disposed in alignment, and welds uniting the body and end sections, said welds being of a depth equal to the sum of the thicknesses of the laminations to provide a plurality of substantially independent containers one within the other.

17. A pressure vessel comprising, in combination, a fluid container capable of holding fluid under pressure, and a plurality of superimposed containers fabricated about the fluid container in close contact with the fluid container and one another to effect a distribution of the stresses imposed on the fluid container by a fluid under pressure, the superimposed containers being substantially independent to permit relative movement and to nest properly when subjected to pressure to get the maximum strength of all the containers.

18. A pressure vessel comprising, in combination, a fabricated fluid container, a plurality of superimposed containers comprising segments of a cylinder disposed around the fluid container with their edges in alignment, ends superimposed over the ends of the fluid container in alignment with the corresponding segments of the cylinder, and welds uniting the segments of the cylinder and ends to one another and to the fluid container.

RICHARD STRESAU.